United States Patent [19]

Weis et al.

[11] Patent Number: 4,916,920
[45] Date of Patent: Apr. 17, 1990

[54] ROTOR STRUCTURE FOR JUICE COLD TEMPERATURE CREAMER

[75] Inventors: William T. Weis; Michael R. Weis, both of Salt Lake City, Utah

[73] Assignee: Fruit-E-Frost Corporation, Salt Lake City, Utah

[21] Appl. No.: 222,648

[22] Filed: Jul. 21, 1988

[51] Int. Cl.$^4$ ............................................. A23G 9/12
[52] U.S. Cl. ..................................... 62/342; 366/196; 366/324
[58] Field of Search ................... 62/342, 343; 366/90, 366/196, 324; 222/410, 413

[56] References Cited

U.S. PATENT DOCUMENTS

| | | | |
|---|---|---|---|
| 1,981,010 | 11/1934 | Torson | 259/109 |
| 2,671,646 | 3/1954 | Lindsey | 259/24 |
| 3,385,568 | 5/1968 | Gray | 259/24 |
| 3,780,536 | 12/1973 | Fishman et al. | 62/342 |
| 4,357,112 | 11/1982 | Davis | 366/279 |
| 4,447,156 | 5/1984 | Csongor | 366/90 X |

FOREIGN PATENT DOCUMENTS 1239861  11/1959  France .

Primary Examiner—William E. Tapolcal
Attorney, Agent, or Firm—Lynn G. Foster

[57] ABSTRACT

Rotor body assemblies for use in a cold temperature cylinder to produce frozen confectionary made from fruit juices or similar liquids. Each assembly comprises a shaft on which are mounted hard plastic blades. The blades may be force fitted within a slot in the shaft, the slot being diagonally oriented from top to bottom with respect to the vertical orientation of each shaft surface. The blades may be formed as one piece with the shaft. Also mounted on the shaft are a conically-shaped top liquid distributor, also of hard food-grade plastic and a bottom ejector of the same material.

6 Claims, 6 Drawing Sheets

ROTOR STRUCTURE FOR JUICE COLD TEMPERATURE CREAMER

FIELD OF INVENTION

The present invention relates generally to frozen confectionary, specifically to mechanisms for creating frozen, creamed confections from fruit juices and like liquids.

PRIOR ART

In the past, there have been several processes developed for producing frozen creamed confectionary. These were first employed in the production of dairy product confectioneries, the earliest type being produced by a small-volume batch process. Continuous-process freezing machines were later developed. Through this process, a liquid is introduced at one end of a refrigerated cylinder and extruded at the other end within a relatively short time span.

With the advent of an increased interest in frozen creamed fruit juice confectionary, several prior art methods have been used to produce such a product. These methods employ stainless steel dasher blades in combination with stainless steel cylinder. Because of the relatively low temperatures employed and the high speed of the machines used, close tolerances between the dasher blades and the cylinder walls are necessary for the constant removal of the frozen juice product continuously collecting on the walls of the cylinder. These close tolerances create problems with the use of the stainless steel blades. Because of the different rates of contraction as the cylinder is refrigerated, the blades can come into contact with the cylinder walls, which in turn causes scoring of the walls with metal fragments being infused into the resulting food product. This also leads to additional problems such as shorter life of the system, reduced efficiency in the freezing process and development of ice chunks in the final product.

In addition, there are other problems associated with the stainless steel blades. One such problem is that the liquid coming into the system freezes on the blades causing clogging of the mechanism. Sometimes blade frozen product later breaks off as ice chunks, lowering the consistency and quality of the finished product. Another problem is the increased cost of manufacturing the blades due to milling needed to meet the close tolerances necessary. A further added expense comes from periodic replacement of such stainless steel blades because of the aforementioned reasons, as well as the added down time necessary to change the blades.

Other problems with the prior art have also been experienced. One such problem is the inability of the prior art machinery to produce a consistent, homogeneous, high quality product. Because disbursement of the liquid into the freezing chamber is not uniform, ice chunks form, creating an inconsistent non-uniform product. A further problem results from the clogging of the freezing chamber above the dispensing holes, which, among other things, increases the down time of the machine with the resultant expenses involved.

Prior art mechanisms of the type in question are very complex and for aligned rotation have been highly dependent on the use of bearings on the rotor shaft external of the creaming cylinder.

With the constantly accelerating demand for frozen creamed juice products, prompted in part by an increased health consciousness of the American public, the problems associated with the prior art discussed above have become of increasing concern.

BRIEF SUMMARY AND OBJECTS OF THE INVENTION

In brief summary, the present invention is directed to a system of producing creamed frozen fruit confectionary products through the use of a unique rotor assembly within a freezing and creaming chamber. Part of the rotor body is a dome-shaped distributor which comprises perimeter apertures for uniform disbursement of the liquid as a film along the inner surface of the freezing chamber. The blade arrangement scrapes the frozen film from the freezing chamber, passes the scraped film from blade to blade in such a way as to homogeneously tumble the same. A novel rotor with synthetic resinous blades is provided which avoid placing fragments thereof in the frozen creamed products, which has long term wear capability and to which the product does not adhere. The invention contemplates a one-piece rotor of synthetic resinous material and the capability of operating at high speeds without the need for external bearings. In addition, the invention employs a bottom plate, or ejector, incorporating angular slots which facilitate the removal of the frozen product from the freezing chamber without clogging. The creamer allows for ease in rotor and/or blade removal for the purposes of cleaning and replacement. In some preferred embodiments external bearings are not required.

With the foregoing in mind it is a principal object of the invention to provide a novel fruit juice and like liquid freezer/creamer mechanism, and related methods.

It is a further significant object to provide an improved freezer/creamer mechanism which increases the efficiency and economy of producing frozen confections from fruit juices and the like.

It is a further important object of the present invention to provide a method of and apparatus for producing a significantly higher quality creamed and frozen confection from fruit juices and the like.

It is another object of the invention to provide a more sanitary noncontaminating apparatus and method of producing creamed and frozen confectionary products from fruit juices and the like.

It is a further object of this invention to provide an economical novel rotor assembly for effective production of creamed and frozen food products from fruit juices and the like.

It is a further significant object to provide a novel apparatus and method of producing a frozen confection of the type mentioned which eliminates clogging of the freezing chamber at the outlet ports.

A further dominant object is the provision of a novel mechanism by which a frozen, creamed food product from fruit juice or the like is produced having one or more Of the following characteristics: possessing a unique rotor assembly, comprises a novel nonstick liquid distributor, has a unique system for passing the product being produced from blade to blade to homogeneously tumble the product, comprises a novel rotor of one-piece synthetic resinous material, comprises novel rotor blade construction, has a novel anti clog discharge mechanism, and does not require bearings external of the rotor assembly.

These and other objects and features of the present invention will be apparent from the following detailed

DETAILED DESCRIPTION OF ILLUSTRATED EMBODIMENTS

Figure 1:
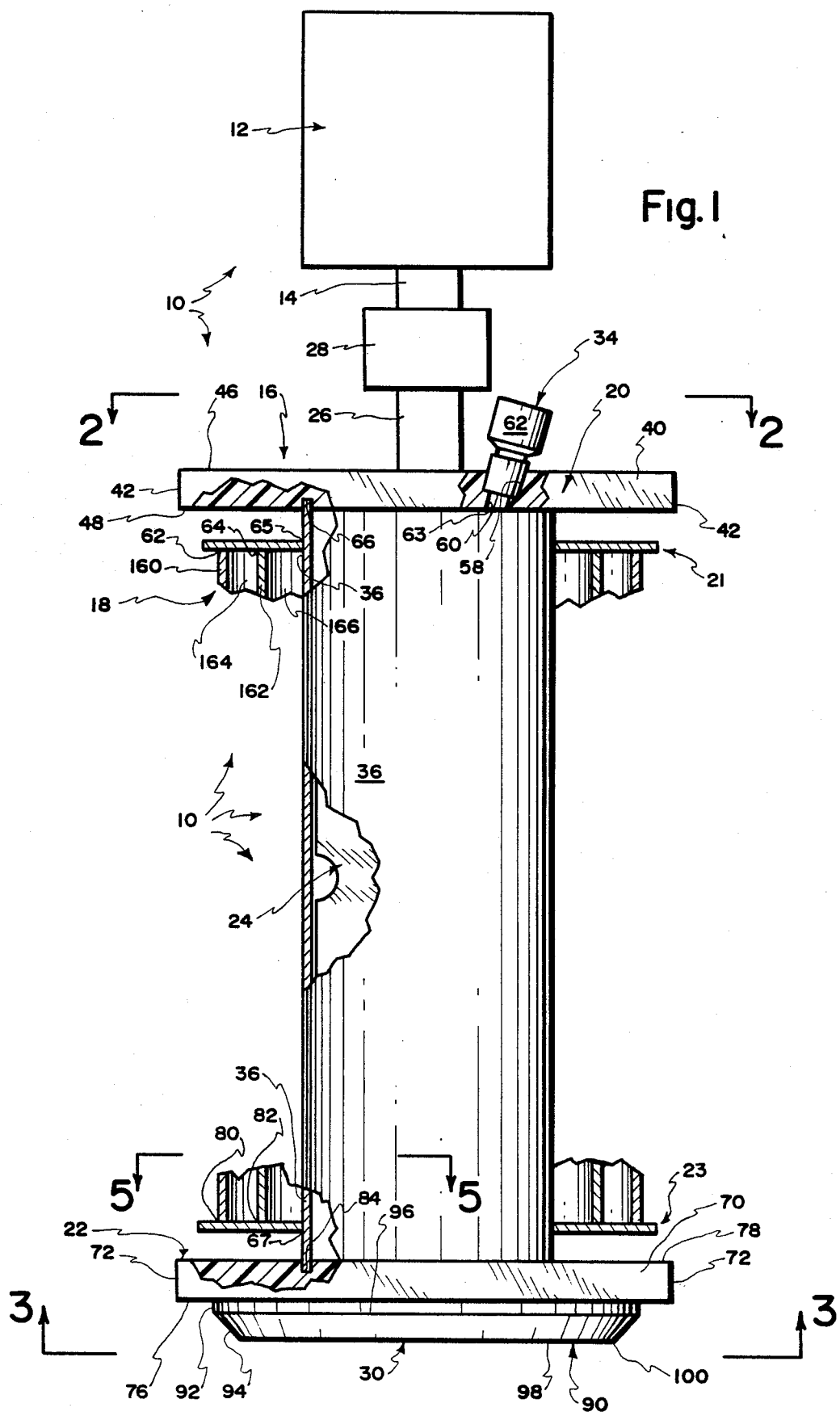
FIG. 1 is a side elevation of a cold temperature creamer for fruit juices and the like, embodying the principles of the present invention.

Reference is now made to the drawings, wherein like numerals are used to designate like parts throughout. Specific reference is made to FIG. 1, which illustrates a presently preferred creamer, generally designated 10. Creamer 10 comprises a motor, generally designated 12, which comprises a drive shaft 14. The creamer 10 also comprises a stator mechanism, generally desiqnated 16, interposed between end plates 20 and 22. Creamer 10 further comprises a cylindrical freezing jacket, generally designated 18, stationarily disposed between two end plates, generally designated 21 and 23, respectively. A rotor, generally designated 24, is disposed rotatably within the interior of the stator 16 and is turned by drive shaft 26 coupled at 28 to the drive shaft 14 of the motor 12. The creamer 10 also comprises a cold temperature cream confectionary product discharge section, generally designated 30.

Generally, the creamer 10, as well as the other creamers disclosed herein, is intended for the production of a frozen creamed confectionary product. To understand broadly the methodology used, further reference is made to FIG. 1. A metered amount of fruit juice or like liquid is introduced as a stream through a intake port 34 and from thence the liquid passes through an opening 63 in the upper plate 16. The liquid then enters the interior of the stator 16, where it is disbursed by the rotor 24.

Rotation of the rotor or the blade mechanism contemporaneously distributes centrifugally the liquid, on a non-splash basis, against the interior surface of the stationary cylinder 36 as a very thin layer, where it instantaneously freezes as a film. The rotating blades of the rotor 24 immediately scrape the film of frozen liquid from the inside surface of the cylinder 36 and tumble it from blade to blade causing it to have a very fine creamed consistency, following which the creamed product is displaced through the discharge section 30 and collected in a cup or other serving container.

The motor 12 is preferably a commercially available electric motor capable of achieving the high speed r.p.m. requirements of the present invention as hereinafter set forth. 1700 r.p.m. is presently preferred. Likewise, the coupling 28 by which the rotation of motor shaft 14 is transferred to the rotor shaft 26 may be of any suitable commercial design.

The upper stator plate 20 is preferably formed of rigid, high strength synthetic resinous material and comprises a normally horizontally-disposed flat wall 40, which is generally square in its illustrated configuration comprising four edges 42 disposed at 90 degrees one in respect to the next. Adjacent edges 42 are joined one to another by an angular connecting surface 44. The wall 40 also comprises a top planer surface 46 and a bottom planar surface 48.

Perpendicular to the plane in which the wall 40 is disposed are four corner apertures 50, one disposed immediately adjacent each corner surface 44. Apertures 50 serve as bolt-receiving holes for mounting purposes, as explained hereinafter in greater detail.

Figure 2:
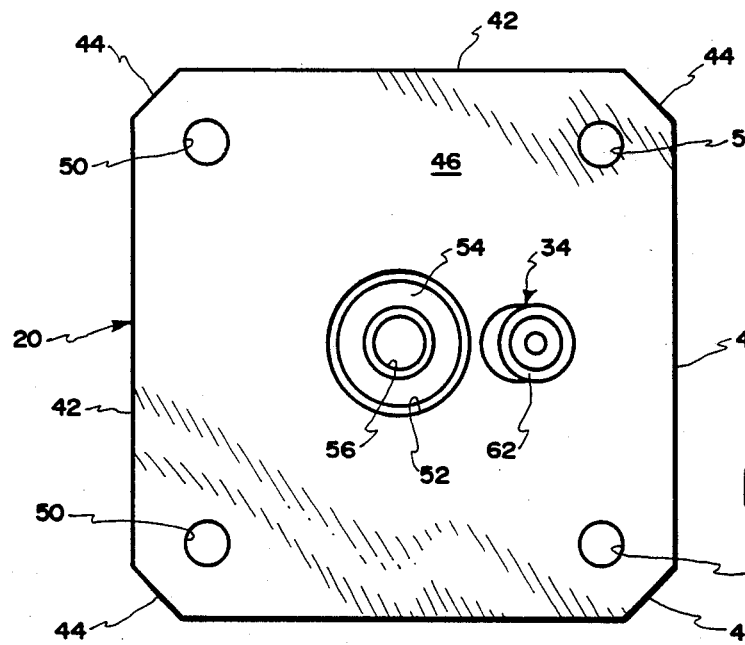
FIG. 2 is a cross sectional view taken along lines 2—2 of FIG. 1.

The wall 40, preferably formed of Delrin available from DuPont, also comprises a central, relatively large aperture 52 into which a conventional bearing 54 is press-fit. See FIG. 2. The bearing 54, at its inner race, defines an aperture 56, which is sized so as to nonrotatably receive the rotor shaft 26 to facilitate aligned, journalled rotation of the rotor.

Adjacent the aperture 52 in wall 40 is a diagonally disposed aperture 58, into which a tube 60 of the liquid inlet port mechanism 34 is press-fit, whereby liquid poured into the hollow top funnel shaped member 62 thereof runs by force of gravity through the tube 60 and the aperture 63 into the interior of the cylinder 36. See FIG. 1.

The bottom flat surface 48 of the wall 40 is interrupted by an annular groove 66, which receives the cylinder 36, as hereinafter more fully explained.

The bottom stator plate 22 comprises a wall 70, preferably formed of Delrin because of its high insulation, dimensionally-stable and nonfreeze properties. Wall 70 comprises a square-shaped configuration formed by four edges 72 which are successively disposed at 90 degrees one in respect to the next. Adjacent edge surfaces 72 are connected by angular corner surfaces 74 disposed at a 45 degree angle in respect to each surface 72. Wall 70 also comprises an exposed lower surface 76 and an upper surface 78. Surface 78 is interrupted by a groove 84. The groove 84 receives the lower end of the hollow cylinder 36, as explained hereinafter in greater detail.

The wall 70 also defines four apertures 86, one disposed in close proximity to each corner edge surface 74. Apertures 50 and 86 are illustrated as being of the same diameter and are aligned in pairs so that four carriage bolts may be placed through the aligned pairs of apertures 50, 86 and tightened against surfaces 46 and 76 to secure the assembly 10 in its assembled, operative relation.

Wall 70 integrally merges with a downwardly directed annular ring 90, the diameter of which is illustrated as being substantially the same as the outside diameter of the freezing jacket 36. See FIG. 5. Annular ring 90 forms part of the cold temperature creamed confectionary product extrusion section 30 and comprises an annular vertical edge surface 92, a beveled surface 94, which merges with surface 92 at angular interface 96, a bottom horizontal edge surface 98, which merges with the diagonal surface 94 at angular interface 100 and internal annular surface 102.

The wall 70 and the annular extension 90 are illustrated as being of one-piece construction and define an axially directed, relatively large aperture 104.

Figure 5:
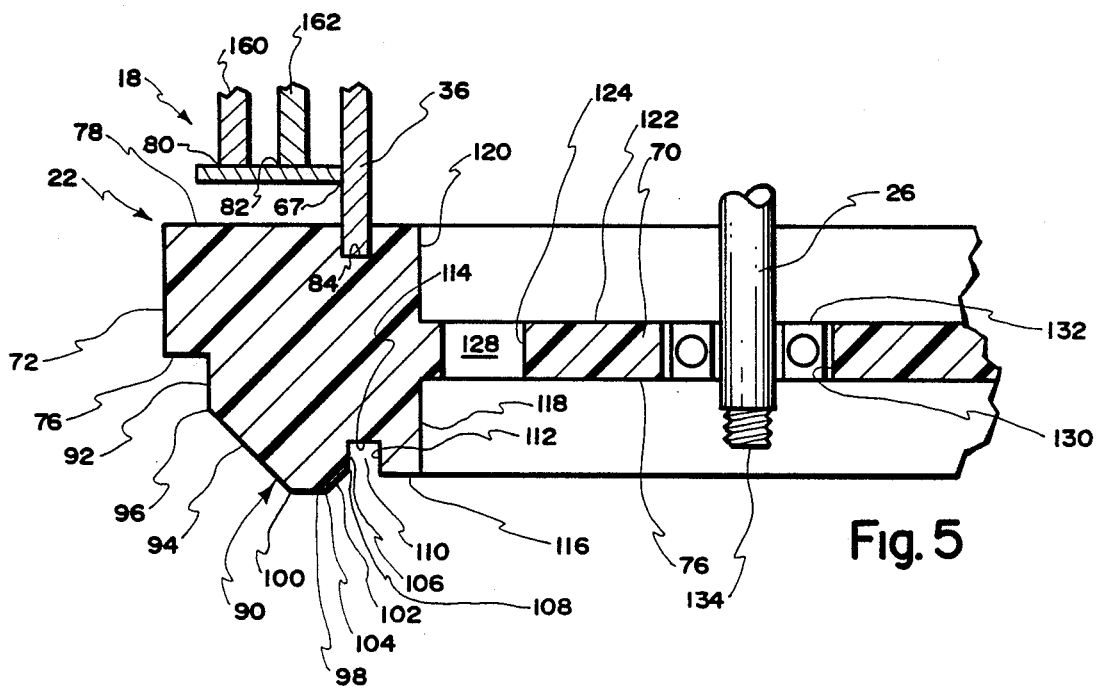
FIG. 5 is an enlarged fragmentary cross-section taken along lines 5—5 of FIG. 1.

As best shown in FIG. 5 the lower edge surface 98 of the annulus 90 merges into a beveled surface 102 at annular interface site 104. Surface 102 merges with an annular vertically-directed surface 106 at site 108. Surface 106 forms one side surface of an annular groove 110 which also comprises a second side surface 112 and a horizontal base surface 114. Side 112 merges with horizontal surface 116 which in turn merges with the vertical annular surface 118. Surface 118 merges with the interior lower surface 76 of the wall 70.

The upper surface 78 of wall 70 is internally stepped at annular shoulder surface 120 which is vertical and merges with a recessed horizontal center surface 122 of the wall. Internal wall 70 is interrupted by a plurality of peanut-shaped apertures 124, each of which has an upwardly directed sloping leading edge 126 and a downwardly sloping trailing edge 128.

Figure 3:
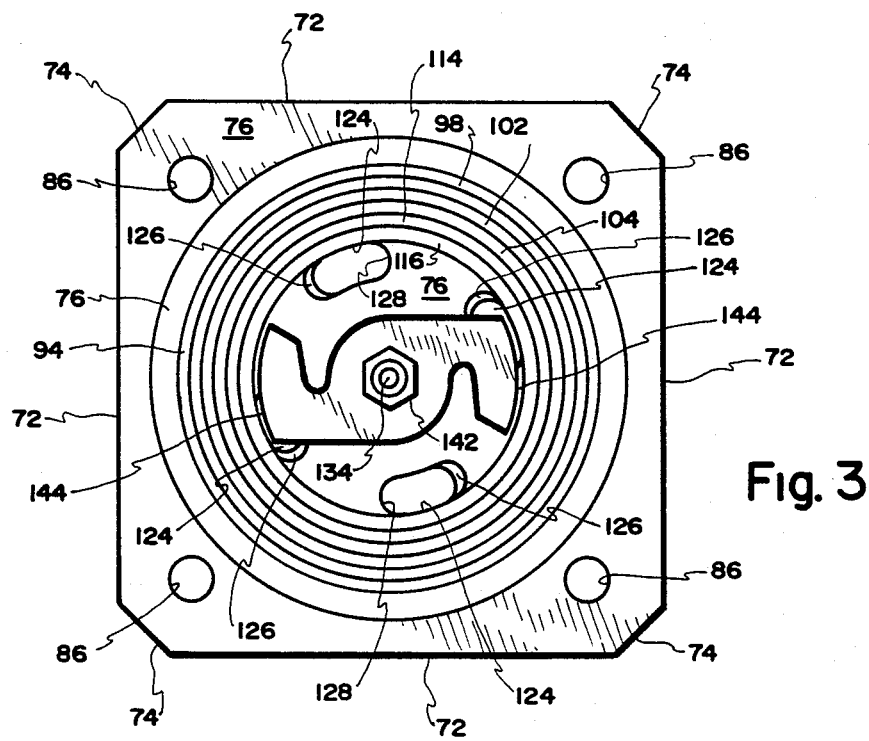
FIG. 3 is a cross-sectional view taken along lines 3—3 of FIG. 1.
Figure 4:
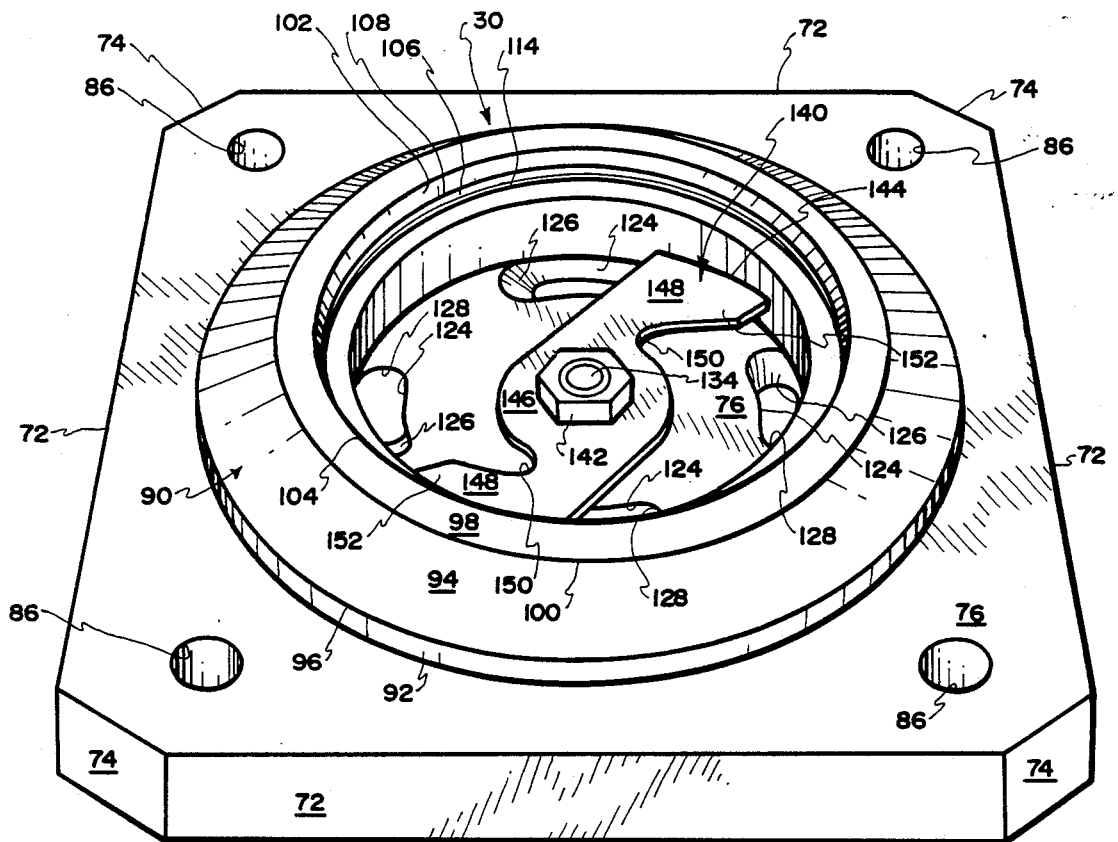
FIG. 4 is an enlarged bottom three dimensional perspective view of the bottom plate with the lower cutoff blade mechanism attached.

The central recessed portion of wall 70 comprises the central aperture 130 in which a Conventional bearing 132 is press fit. The internal opening of the bearing of 132 at the inner race rotatably receives the lower end of the rotor shaft 26, which has a reduced diameter threaded end 134 upon which a blade 140 is nonrotatably secured by a central nut 142 threaded upon the threads at shaft end 134. Preferably the nut 142 is spot welded to and turns with the extrusion blade 140. See FIGS. 3 and 4.

Blade 140 comprises radial edges 144 which are sized to rotate with a very small tolerance clearance adjacent shoulder wall 120. Preferably the blade 140 is formed of stainless steel and comprises a central apertured area over which the nut 142 is placed in aligned relation. The central hub 146 is integral with two blades 148 which are disposed in 180 degree positions one in respect to the other. Each blade 148 is necked down at site 150 and thereafter enlarged with the leading tip 152 of each blade being disposed at an angle to the horizontal while the remainder of the extrusion blade mechanism 140 is disposed on a horizontal plane whereby rotation of the blade mechanism 140 attractively decorates the extruded frozen, creamed confectionary product emerging from the creamer 10 into a cup or the like in such a way that clogging is avoided. The cup may be sized and shaped so that its upper lip fits comfortably within the annular slot 110 in the annulus 90 to insure an absence of spilling during product extrusion.

The cold temperature jacket 18 comprises an external cylindrical wall 160 (FIG. 1) which may be of a suitable metal or other satisfactory material and an interior cylindrical wall 162, also formed of a satisfactory metal or other suitable material. A space 164 exist between the cylindrical walls 160 and 162, the ends of which are connected as by welding at sites 62 and 64, respectively, to metal end plate 21, and connected as by welding at sites 80 and 82 to metal plate 23, each in fluid-tight relation. The space 164 may be a dead air space or may be filled with a suitable insulating material. Plates 21 and 23 are connected respectively in fluid tight relation at sites 65 and 67 to cylinder 36.

The creamer cylinder 36 comprises a thin wall, preferably of stainless steel, of uniform dimension throughout and is separated from the interior cold temperature jacket cylinder 162 by a space 166. Space 166, as hereinafter more fully described receives a cold temperature medium, such as freon, so as to bring the temperature of the creamer cylinder 36 to a very low level. Minus 20 degrees Fahrenheit is presently preferred. As stated, the upper and lower end edges of the creamer cylinder 36 are seated in fluid-tight relation in annular groove 66 of wall 40 and annular groove 84 of wall 70.

The rotor 24 may take any one of several forms within the scope of the present invention whereby novel blade structure scrapes a continuously deposited layer of fruit juice as a frozen film from the interior surface of the cylinder 36 and tumbles the same from blade to blade whereby a cold temperature creamed confectionary product is extruded having a smooth nongranular consistent makeup at the peanut-shaped holes 124 of the product-extruding section 30.

Figure 6:
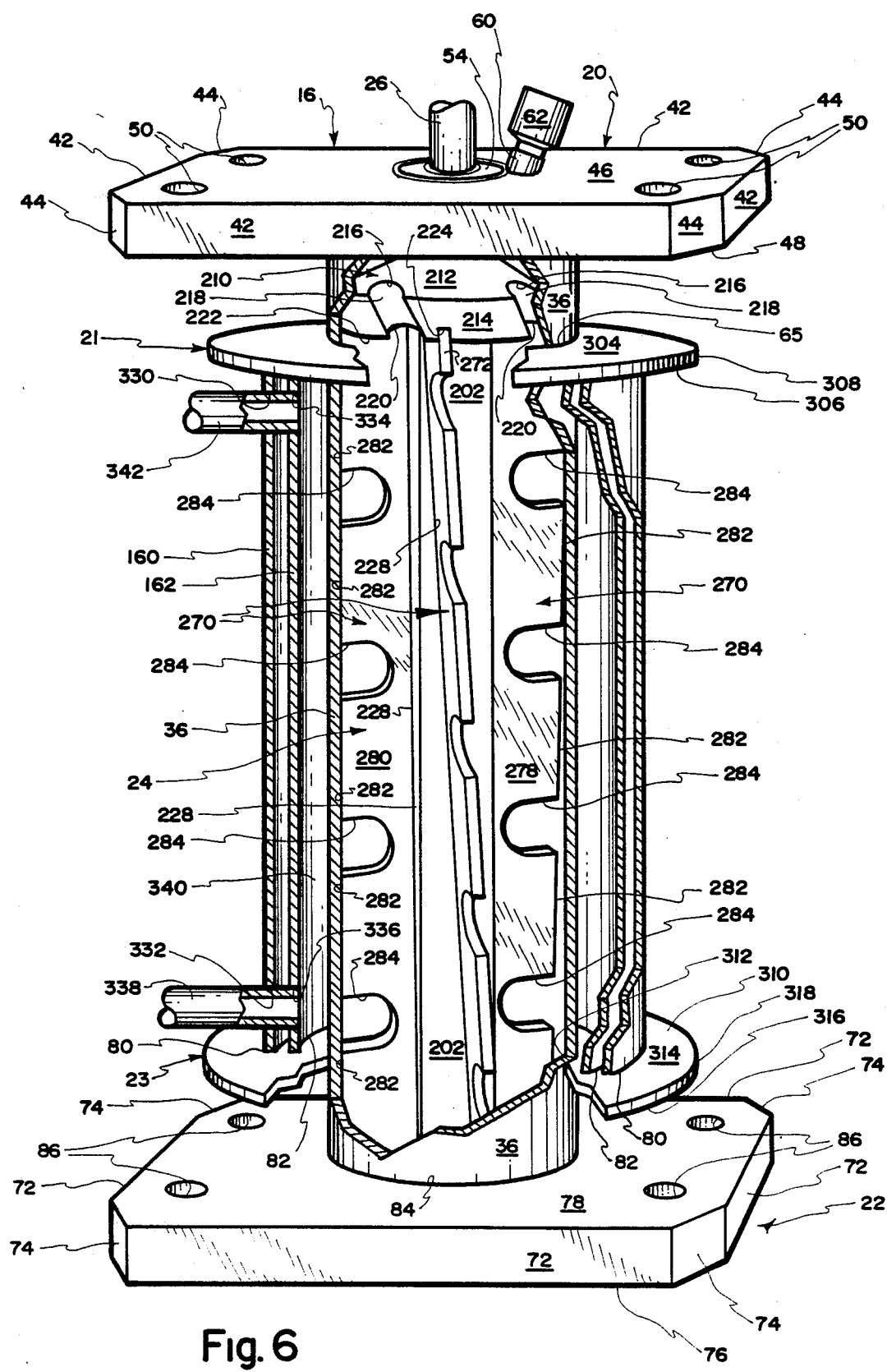
FIG. 6 is an enlarged perspective with parts broken away for clarity of second presently preferred creamer.
Figure 7:
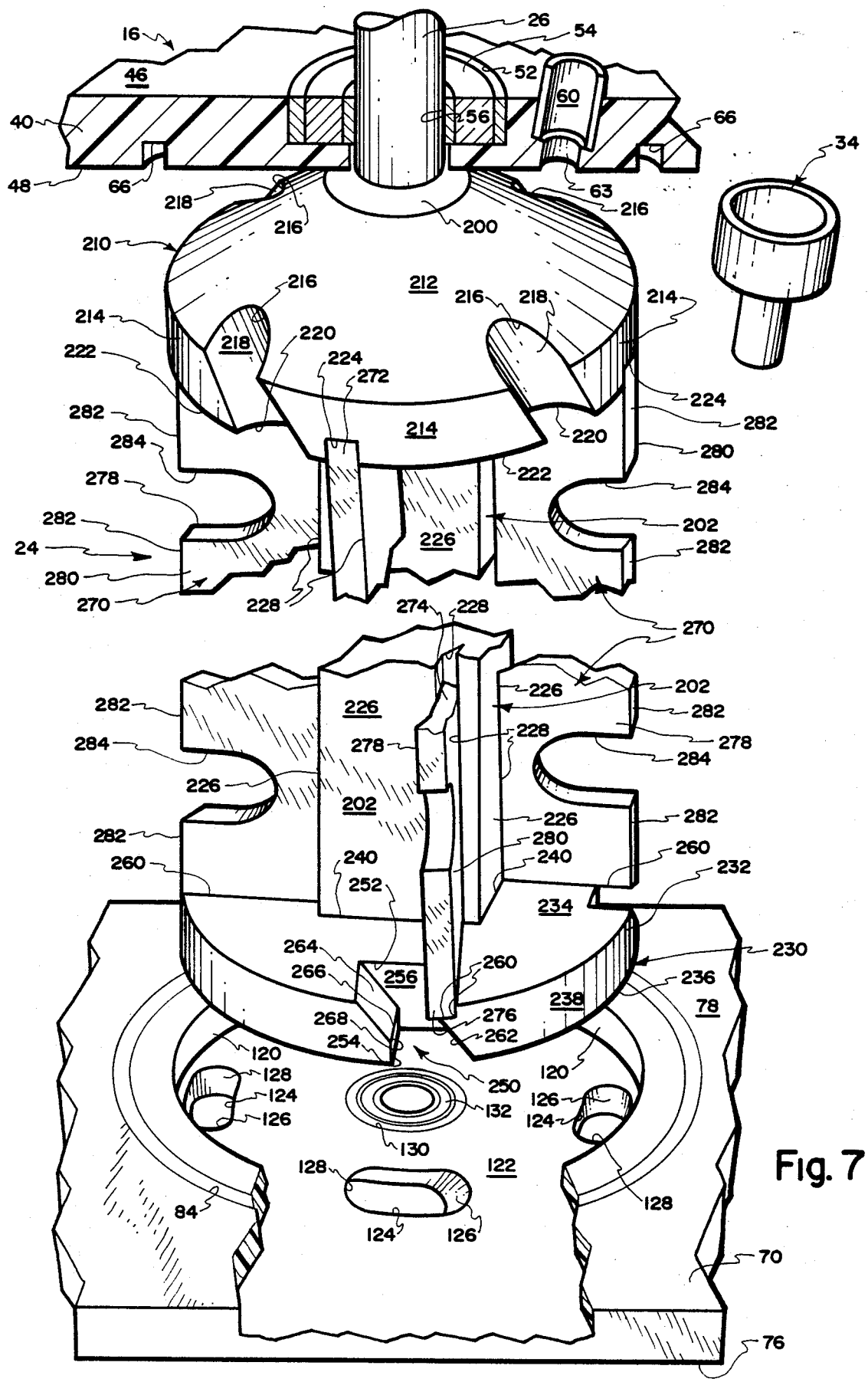
FIG. 7 is an enlarged perspective with parts broken away and removed for clarity primarily of the rotor of the creamer mechanism of FIG. 1.

One suitable rotor 24 is best illustrated in FIGS. 6 and 7 to which reference is now made. The shaft 26 is enlarged diametrally just below the bearing 54 at rounded sloped shoulder 200. The enlarged rounded section 200 of the shaft merges with a central section 202 of the shaft. See FIG. 7. The central shaft section 202 is illustrated as being rectangular or square in cross-section. Preferably the shaft is formed of stainless steel construction so that it does not corrode when subjected to fruit juices and the like. The central shaft section 202 merges integrally with the lower circular end 26 of the shaft which is journalled in the lower bearing 132. See FIG. 5.

The rotor 24 further comprises a liquid distributor head, generally designated 210, which is nonrotatably secured to the shaft 26 by contiguous non-rotatable engagement with the central square section 202 of the shaft. The non-splash distributor head 210 is preferably formed of Delrin or other high wear, dimensionally stable synthetic resinous material to which the liquid does not adhere or freeze. Distributor head 210 comprises a body comprising an upper dome-shaped surface 212, which is sloped downwardly from the shaft enlargement 200 (FIG. 7) to the outside circular edge 214 of the liquid distributor head. By use of Delrin or equivalent synthetic resinous material, even though the interior within the creamer cylinder 36 is extremely cold, liquid entering the upper mouth 62 of the influent funnel 60 thereafter striking the upper dome shaped surface 212 will not adhere or freeze along said surface.

The liquid placed in &he influent opening 62 of the funnel 60 passes by force of gravity through the funnel 60 and the aperture 63 (FIG. 1 and 7) and then falls in a non-splash upon the dome-shaped surface 212 as the rotor is rotated at high speed. The combined gravitational and centrifugal forces, which act upon the liquid progressively falling upon the surface 212 cause the liquid to move as a thin layer downwardly and outwardly toward the interior surface of the creamer cylinder 36. The fruit juice or other liquid, as it approaches the interior surface of the cylinder 36 is intercepted by the upper openings 216 which feed diagonally disposed passageways 218, four of which are illustrated in FIG. 7. Liquid intercepted at the upper opening 216 of any diagonal passageway 218 is caused to be forceably engaged by the diagonal wall surface of the associated diagonal passageway 218. The angle of each passageway 218 coupled with the high speed of rotation of the distributor head 210 forces the liquid to flow, again as a continuous relatively thin layer down the trailing surface of the passageways 218 in a downward and radially outward directed. This layer of liquid, as it emerges from the effluent lower opening 220 of each diagonal passageway 218, is thrown as a thin liquid film against the cold interior surface of the cylinder 36 and immediately thereafter scraped from said surface by the blades of the rotor 24.

The undersurface 222 of the liquid distributor head 210 is flat and disposed in a horizontal plane, as illustrated in the Figures.

The lower surface 222 of the distributor head 210 is, however, interrupted by a plurality of slots 224. Each slot 224 is disposed at a slight angle in respect to the vertical and is somewhat nonradial to accommodate receipt of the upper end of one of the blades of the rotor at optimum blade pitch and angle to facilitate scraping of the frozen film of fruit juice or the like progressively deposited by the distributor head 210 upon the interior surface of the low temperature cylindrical wall 36.

The diameter of the edge surface 214 of the distributor head 210 is sized so as to be rotatably though in close proximity to the interior surface of the cylinder 36.

The central section of the shaft 202, which is illustrated as being essentially square in cross section, comprises four exposed surfaces 226, each of which has a blade-receiving slot, which is nonradial and diagonal along the associated surface 226 so that the blade inserted in the slot 228 is disposed at a pitch to the radial and diagonally as well in respect to the vertical. Thus, the outer blade edges are pitched in two directions to enhance the contiguous scraping of frozen film from the interior surface of the cylinder 36.

With further reference to FIG. 7, the lower end of the rotor 24 comprises a frozen confectionary effluent plate generally designated 230. Plate 230, when the creamer 10 is fully assembled, is constructed so as to fit within the lower portion of 36 which is recessed as defined by wall surfaces 120 and 122 of wall 70 (FIG. 5). The frozen product effluent plate 230 comprises a disk-shaped wall 232 which comprises a top surface 234 and a bottom surface 236, each disposed in a horizontal plane. The wall 232 further comprises a circular perimeter edge 238, the diameter of which is slightly less than the diameter of the wall surface 36 so that edge 238 rotates in close relationship to the surface 36. The frozen product effluent plate 230 comprises a square aperture 240, located at the center thereof into which the square section 202 of the shaft 26 is force-fit so that the plate 230 is nonrotatably associated with the shaft and rotates as the shaft rotates.

The plate 230 comprises four passageways, disposed at 90 degree spacing, through which the frozen, creamed fruit juice confectionary product passes. Each passageway is disposed as a diagonal notch, generally designated 250, in the perimeter at the edge 238 of the plate. Each passageway 250 is disposed primarily forward of the leading edge of one of the blades forming the rotor 24. Thus, each passageway 250 is open between spaced portions of the perimeter edge surface 238. Each passageway 250 comprises a top rectangular opening 252 FIG. 7) and a bottom rectangular opening 254. Each passageway 250 comprises a vertically directed side surface 256, which extends from the opening 252 at top surface 234 to the opening 254 at the bottom surface 236, as best illustrated in FIG. 7.

The top surface 234 of the plate 230 is interrupted by a plurality of nonradial slots 260, each of which is sized and shaped to receive the lower end of one of the rotor blades in snug interference-fit relationship. Each slot 260 extends a relatively short distance into the body of the material forming wall 232 of plate 230, as best illustrated in FIG. 7. The outer portion 276 of each slot 260 opens at one passageway 250. Thus, as the rotor 24 rotates at high speed, confectionary product, in its creamed frozen state, reaching the top surface 234 of the plate 230 will impact against the leading surface of the blade disposed at the associated passageway 250 and be deflected in a downward direction to the associated slot 250.

Each passageway 250 comprises a leading sloped surface 262, which extends generally radially from the side surface 256 from the perimeter edge 238 of the plate 230 and from the base of the associated blade slot 260 to the lower surface 236 of the plate 230.

Each passageway 250 comprises a trailing sloped surface 264, which runs generally radially from the surface 256 to the surface 238 and downwardly in the diagonal direction from left to right, as viewed in FIGS. 7, from the surface 234 to a location vertically above the surface 236 at interface 266. Surface 264 merges at interface 266 with a relatively short vertical surface 268, which runs from interface 266 to surface 236. Thus, as the frozen creamed confectionary product is displaced into each passageway 250 during rotation of the rotor 24, it is caused to be displaced not only by gravity but by the angular disposition of the passageway chute 250. The angular orientation of the passageways 250 significantly prevents clOgging due to accumulation of the confectionary product at plate 230. Confectionary product, passing as an effluent from each passageway 250 at opening 254, is likewise displaced through the angular peanut-shaped directional openings 124 of the wall 70 and from thence to a cup or other consumer receptacle, the blade mechanism 140 rotating to impose a surface design on the product egressing from the apertures 124 as the same falls progressively into the cup or other container.

As mentioned earlier, the rotor 24 comprises, as illustrated, four blades which are interference fit into recessed 224, 228 and 260 so that the blades taper from top to bottom in a direction away from the direction of rotation and are disposed so as to be at an acute angle in respect to a tanqential line at the interface between each blade and the interior surface of the cylinder 36. Each blade, generally designated 270, comprises an upper angularly disposed end 272, configured, sized and shaped to tightly fit within the associated angular groove 224, a shaft engaging edge 274 (FIG. 7), configurated, sized and shaped to be received in interference fit relationship within the associated shaft groove 228 and a lower angularly disposed end 276 configurated, sized and shaped to tightly fit in the associated groove 260. The pitch of each blade is presently preferred to be one inch for a cylinder having a ten and a half inch length.

Each blade 270 is preferably formed of Delrin because of its high wear characteristics, its liquid non-freezing properties and its dimensional stability in low temperature environments. Each blade 270 is illustrated as being of uniform thickness throughout comprising a leading flat surface 278 and a trailing flat surface 280. Each blade 270 comprises outer edge segments 282 which are substantially blunt but disposed at an angle such that each edge segment surface 282 is substantially flatly and contiguously engages the interior surface of the cylinder 36. Each two adjacent edge surface segments 282 of any blade 270 are interrupted by a notch 284, which is illustrated as extending into the blade 270 a distance greater than half of its exposed distance between the shaft section 202 and the cylinder 36. The notches 284 may be varied in number and in shape, although something on the order of five such notches is presently preferred. It is currently preferred that the notches 284 be essentially finger-shaped consisting of a rounded interior edge and linear top and bottom edge portions which intersect the adjacent edges 282. The notches 284 in one blade 270 are preferably offset from the notches 284 in adjacent blades 270 so that the entire interior surface of the cylinder is contiguously scraped collectively by the blade edges 282.

The purpose of the slots 284 is significant. As the angular blades, at the distal edge segments 282 thereof, contiguously contact the interior surface of the cylinder 36, the frozen film of fruit juice or the like is progressively scraped from the surface and is essentially snowplowed in a downward direction along the sloped leading surface 278 of the blade adjacent the interior surface of the cylinder 36. As the flow of scraped frozen fruit juice reaches each slot 284, the scraped frozen juice passes through the slot 284 and begins to fall. However, the falling frozen fruit juice is intercepted by the next consecutive blade 270 at the leading surface 278 thereof at a location below the slot 284 of the prior blade through which the frozen fruit juice passed. Again the frozen fruit juice is snowplowed along the surface of the second blade until it passes through the next lower slot 284 in the second blade. This process is continued causing the scraped frozen fruit juice to be tumbled and displaced from bladed to blade so that there is a blending action producing a texturally smooth and homogeneous frozen creamed product at the discharge site of the creamer 10.

The previously described, insulating jacket cylinders 160 and 162 are attached top and bottom to metal washer-shaped disks or plates 21 and 23, at sites 62 and 64 and 80 and 82, as by welding. See FIG. 6. The disks 21 and 23 are rigidly secured in horizontal planes. The disk 21 is illustrated as being of uniform thickness throughout comprising a top surface 304, a bottom surface 306 and a peripheral edge 308. The diameter of the edge 308 exceeds the diameter of the jacket cylinder 160. The upper edges of the cylinders 160 and 162 are integrally secured in liquid tight relation to the undersurface of the metal disk 21 at sites 62 and 64 (FIG. 1) as by welding or other suitable techniques.

The second metal annular disk 23 is disposed a relatively short distance above the plate 22 and comprises a central aperture 312 which is contiguous with the exterior surface of the cylinder 36, with the disk 23 and the cylinder 36 being welded one to the other at site 67 adjacent to the aperture 312. The disk 23 is illustrated as being of uniform thickness throughout comprising upper surface 314, lower surface 316 and peripheral circular edge 318. The lower edges of the cylinders 160 and 162 are secured integrally and in liquid-tight relation to the upper surface of the disk 23 at sites 80 and 82 in a conventional manner as by welding.

The wall comprising cylinder 160 is illustrated as having an upper aperture 330 and a lower aperture 332 disposed therein. Likewise, the cylinder 162 comprises a top aperture 334 and 336. Apertures 330 and 334 are aligned and are illustrated as having the same diameter. Apertures 332 and 336 are illustrated as being aligned and have the same diameter. An influent tube 338 is disposed in apertures 332 and 336 in fluid tight relation by which freon or other refrigerant, at a suitably cold temperature level, is introduced into the space 340 between the cylinders 162 and 36. Thus, the cylinder 36 is caused to reach the necessary extremely cold temperatures required to produce a frozen creamed product from fruit juice and like liquids. An effluent tube 342 disposed in apertures and 330 and 334 in fluid-tight relation, provides for the discharge of freon from the chamber 340. Freon or the like is supplied to the influent tube 338 from a conventional source.

Figure 8:
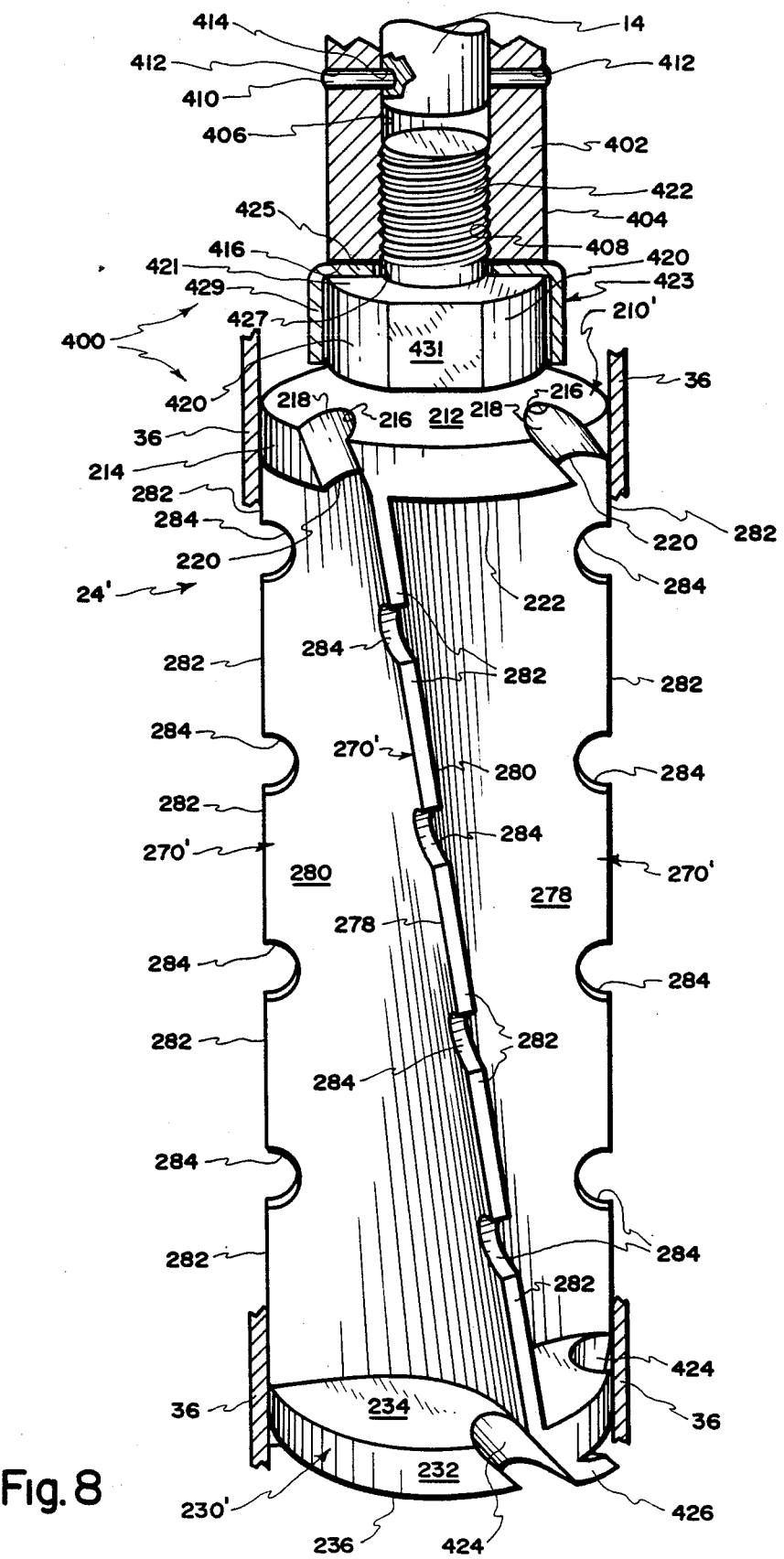
FIG. 8 is an enlarged perspective of a further presently preferred creamer, with parts broken away and removed for clarity.

Reference is now made to FIG. 8 which illustrates a still further presently preferred mechanism by which fruit juice or the like is converted to an ice cream-like product. The creamer, generally designated 400, of FIG. 8 is a bearingless mechanism which is suspended from the shaft 14 of the motor by use of a sleeve coupler 402. Sleeve 402 comprises an outside cylindrical surface 404 of uniform diameter throughout and an inside surface, the top portion 406 of which has a smooth internal surface of uniform diameter. The lower portion of the internal surface of the sleeve 402 comprises threads 408. A coupling pin 410 passes through opposed apertures 412 in the sleeve 402, which are aligned, and through an aligned aperture 414 in the motor drive shaft 14. Thus, pin 410 nonrotatably couples the motor shaft 14 to the collar 402. Thus, as the shaft 14 rotates so rotates the sleeve or collar 402. The collar 402 is illustrated as having a blunt lower edge 416 disposed in a plane substantially transverse to the axis of the sleeve 402. Although not shown, the creamer 400 comprises top and bottom end plates through which fruit juice or the like is introduced and an ice cream-like product discharged, respectively, as explained herein. The creamer 400 also comprises, although not shown, the freezing jacket on the outside thereof so as to bring the temperature of the creamer cylinder 36 to the proper level. Thus, except as explained herein, the creamer 400 has the features heretofore explained in respect to the other disclosed creamers.

However, creamer 400 is fabricated without a bearing relationship between the top and bottom plates and the creamer shaft. Instead, the top liquid distributor 210' is fabricated so as to have a close tolerance relationship with the inside surface of the cylinder 36, which cylinder serves or functions in regard to the liquid distributor 210' as a bushing for aligned rotation of the rotor 24'. Similarly, the lower rotor plate 230' is sized so as to have a close tolerance relationship with the inside surface of the cylinder 36 whereby the cylinder functions as a bushing for the rotation of the lower part of the rotor 24'.

Furthermore, the rotor 24' is of one piece construction, preferably fabricated from synthetic resinous material which is dimensionally stable under low temperatures and which does not cause liquid in contact therewith at low temperatures to freeze to the rotor. Presently, it is preferred that the rotor 24' be formed as a single piece by either conventional injection molding techniques or by machining the rotor 24' from a solid piece of suitable synthetic resinous material such as Delrin.

Rotor 24' comprises an upper threaded shaft 422 which threadedly engages threads 408 of coupling sleeve 402. Threaded shaft 422 merges at horizontal shoulder 421 with an enlargement 420. Enlargement 420 is generally cylindrical in shape with two opposed flats 431 for wrench tightening and loosening. An inverted cup-shaped metal separator 423 comprises a top horizontal wall 425 having a central aperture 427 sized to fit over shaft 422. Wall 425 merges into a generally annular wall 429 which contiguously engages the surface of enlargement 420, including wrench flats 431. Separator 423 serves to relieve the stress imposed upon the threads of shaft 422 and transfer the same to the enlargement 423.

The liquid distributor 210' differs from the distributor 210, heretofore described, only in that it does not have a tongue and groove relationship but rather is integral with each of the blades 270' of the rotor 24'. Preferably, the rotor 24' comprises three blades 270'. The creamer 400 does not have an independent shaft but the liquid distributor 210, the blades 270' and the lower plate 230' each merge with a central body of material running along the axis of the creamer 400 which body of material functions as a shaft. The liquid distributor 210 integrally merges with an axial upwardly projecting enlargement 420.

Preferably, the blades 270' have the same pitch and angular disposition as explained heretofore in conjunction with blades 270 and have the same flat fore and aft surface construction as well as the same scraping edge construction with recesses at spaced locations whereby the recesses in consecutive blades are offset in respect to each other. The same numerals used in conjunction with the blade in FIG. 7 are therefore in FIG. 8.

The bottom plate 230' comprises a plurality of circular passageways 424, which function in substantially the same manner as the diaqonal passageways 250, heretofore described.

The interface between the integral blades 270' of the rotor 24' in each case is illustrated as being curvilinear in its configuration.

The plate 230' is illustrated as having one or more downwardly projecting fingers 426, formed integrally with the remainder of the rotor 24' and which function to provide a decorative top surface appearance to the extruded ice cream-like product in the same manner as the previously described blade tips 144.

The invention may be embodied in other specific forms without departing from the spirit or essential characteristics thereof. The present embodiments are, therefore, considered in all respects as illustrative and not restrictive, the scope of the foregoing description, and all changes which come within the meaning and range of equivalency of the claims are therefore intended to be embraced therein.

What is claimed and desired to be secured by United States Letters Patent is:

1. A creamer mechanism for producing an ice cream-like frozen product from fruit juice or like liquid, comprising:

low temperature stationary means comprising hollow cylinder means in which a frozen ice cream-like product is formed, refrigeration means surrounding the cylinder means, and opposed end means substantially closing the respective ends of the cylinder means, wherein each end means do not rotationally journal the rotor means;

liquid influent means associated with one end means;

frozen product effluent means associated with the other end means;

synthetic resinous rotor means comprising shaft means, adapted to be motor-driven, rotatably extending through and exposed beyond one of the end means, radially-extending liquid distributor means integrally joined to the shaft means disposed within the cylinder means juxtaposed the liquid influent means;

spaced blade means of synthetic resinous material to which said liquid does not freeze integrally carried by the shaft means which blade means scrape frozen liquid from the inside surface of the cylinder means and tumble the same from blade means-to-blade means and radially-extending frozen product discharge means adjacent the frozen product effluent means;

the radially extending liquid distributor means and the radially extending frozen food discharge means alignedly journalling the rotor means within the cylinder means to accommodate high speed rotation.

2. A creamer mechanism for producing an ice cream-like frozen product from fruit juice or like liquid, comprising:

low temperature stationary means comprising hollow cylinder means in which a frozen ice cream-like product is formed, refrigeration means surrounding the cylinder means, and opposed end means substantially closing the respective ends of the cylinder means;

liquid influent means associated with one end means;

frozen product effluent means associated with the other end means;

synthetic resinous rotor means comprising shaft means, adapted to be motor-driven, rotatably extending through and exposed beyond one of the end means, radially-extending liquid distributor means integrally joined to the shaft means disposed within the cylinder means juxtaposed the liquid influent means, the radially-extending liquid distributor means comprising means at least partially journalling the rotor within the stationary means and a dome-shaped top surface along which the liquid flows downwardly and radially outwardly by force of gravity and by centrifugal force during rotation, the distributor means further comprising edge slots through which the liquid flows in a downward direction toward the blade means and against the low temperature inside surface of the cylinder means;

spaced blade means of synthetic resinous material to which said liquid does not freeze integrally carried by the shaft means which blade means scrape frozen liquid from the inside surface of the cylinder means and tumble the same from blade means-to-blade means and radially-extending frozen product discharge means adjacent the frozen product effluent means.

3. A creamer according to claim 1 wherein the edge slots are diagonally disposed at a demand angle away from the direction of rotation of the rotor means.

4. A creamer mechanism for producing an ice cream-like frozen product from fruit juice or like liquid, comprising:

low temperature stationary means comprising a metallic hollow cylinder means in which a frozen ice cream-like product is formed, refrigeration means surrounding the cylinder means, and opposed end means substantially closing the respective ends of the cylinder means;

liquid influent means associated with one end means;

frozen product effluent means associated with the other end means;

synthetic resinous rotor means comprising synthetic resinous shaft means, adapted to be motor-driven, exposed beyond one of the end means, radially-extending synthetic resinous liquid distributor means integral with the shaft means disposed within the cylinder means juxtaposed the liquid influent means;

spaced synthetic resinous blade means integral with the shaft means which blade means scrape frozen liquid from the inside surface of the cylinder means and tumble the same from blade means-to-blade means and radially-extending frozen product discharge means adjacent the frozen product effluent means;

the radially-extending synthetic resinous liquid distributor means comprising a dome-shaped top non-freeze surface along which the liquid flows downwardly and radially outwardly by force of gravity and by centrifugal force during rotation, the distributor means further comprising edge passageways through which the liquid flows in a downward direction toward the blade means and against the low temperature inside surface of the cylinder means.

5. A creamer mechanism according to claim 4 wherein the distributor means at least partially journal the rotor means within the stationary means.

6. A creamer mechanism according to claim 4 wherein the frozen product effluent means at least partially journal the rotor means within the stationary means.

* * * * *